H. CORDES.
COMBINED ROLLER AND HARROW.
APPLICATION FILED SEPT. 19, 1910.
985,728.
Patented Feb. 28, 1911.
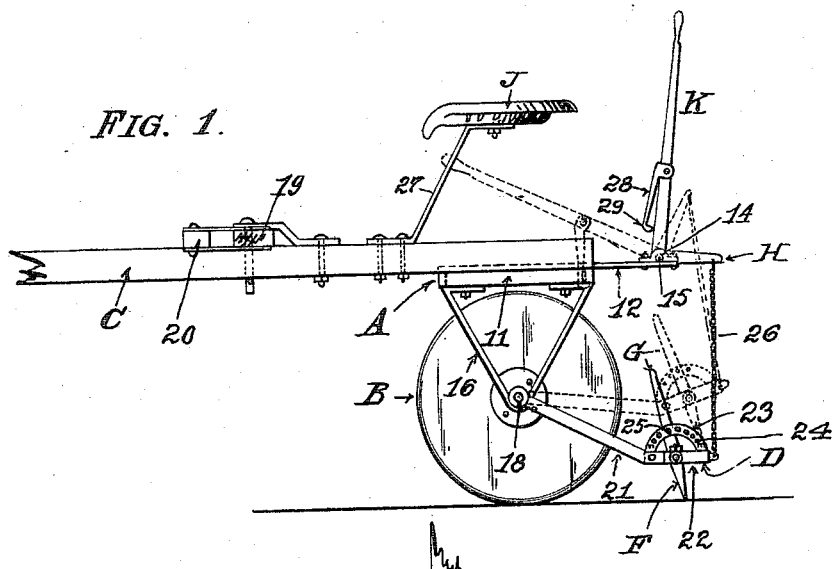
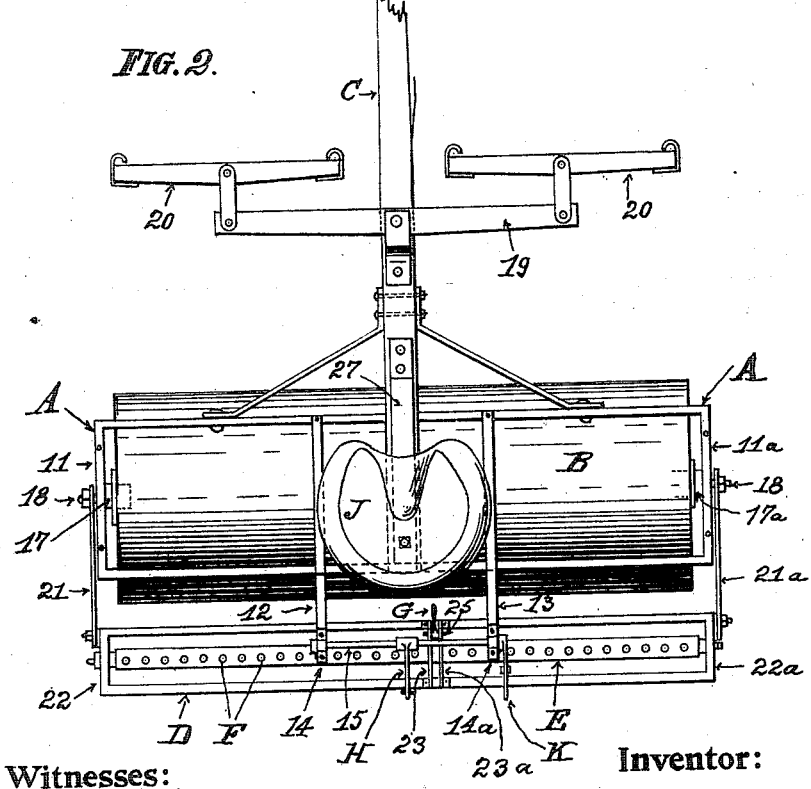
Witnesses:
C. B. Knudsen.
A. S. Peterson.
Inventor:
Henry Cordes,
By Michael J. Stark & Sons,
Attorneys.

UNITED STATES PATENT OFFICE.

HENRY CORDES, OF DENVER, COLORADO.

COMBINED ROLLER AND HARROW.

985,728.

Specification of Letters Patent. Patented Feb. 28, 1911.

Application filed September 19, 1910. Serial No. 582,669.

*To all whom it may concern:*

Be it known that I, HENRY CORDES, a citizen of the United States, and resident of Denver, in the county of Denver and State of Colorado, have invented certain new and useful Improvements in a Combined Roller and Harrow; and I do hereby declare that the following description of my said invention, taken in connection with the accompanying sheet of drawings, forms a full, clear, and exact specification, which will enable others skilled in the art to which it appertains to make and use the same.

This invention has general reference to improvements in a combined roller and harrow; and it consists, essentially, in the novel and peculiar combination of parts and details of construction, as hereinafter first fully set forth and described and then pointed out in the claim.

In the drawings already referred to, which serve to illustrate this invention more fully, Figure 1 is a side elevation of this improved machine. Fig. 2 is a plan of the same like parts being designated by corresponding symbols and characters in all the figures.

The object of this invention is the production of an efficient, serviceable, durable, and comparatively inexpensive clod-crusher and harrow combined, which, while adapted for general use, is especially well suited for the preparation of the soil for sugar beet cultivation, which in the sugar-beet belts in the west and south west of the United States requires considerable working owing to the nature of the soil and the dryness of the climate.

A, in the drawings designates a rectangular, preferably metallic, main frame made either in flat, or from angle iron. This main frame has longitudinally of the machine, two bars 12, 13, both of which reach backward beyond the main frame A a suitable distance, and they carry near their rear ends bearings 14, 14$^a$, in which is mounted a shaft 15, to which will be hereinafter again referred.

Below each of the outer members 11, 11$^a$, of the main frame A, there are located downwardly projecting brackets 16, terminating in bearings 17, 17$^a$, in which is journaled an axle or shaft 18, for the roller B. This roller is of sufficient length and diameter to afford the required bulk or weight to produce the desired effect of crushing the clods when rolled over the field, and it is made either from wood, iron, stone, or concrete, the latter material being especially well suited for this purpose owing to its cheapness, durability, and strength.

Midway of the main frame A there is fastened the pole C, having a swingle tree 19, and double trees 20 of usual construction to permit the machine being operated by a team of draft animals in the usual manner.

Below the main frame A, and rearwardly of the roller B, there is an auxiliary rectangular frame D, said frame D being connected to the axle 18 by pivotal bars 21, 21$^a$, which are connected at one end to the end members 22, 22$^a$, or formed integral therewith, the other ends of said bars being pivoted to the axle 18, or any other convenient member of the main frame A.

In the auxiliary frame D there is located a bar E, pivoted at its ends in the end members 22, 22$^a$, thereof, said bar being fitted with a suitable member of harrow teeth F, of any desired construction, said harrow teeth being preferably removably secured to said bar E to permit of the removal of one or more of said teeth in case repairs become necessary or desirable. From the upper surface of the bar E leads an upwardly projecting arm G, and straddling the side members of the auxiliary frame D, there are two curved bars 23, 23$^a$, in which there are apertures 24, through any one of which and a corresponding hole in the arm G, a bolt 25, may be passed to lock the arm G and with it the bar $e$ and harrow teeth F at any desired angular position with reference to the ground over which the machine is being moved. The curved bars 23, 23$^a$, serve, in addition to their affording means for locking the arm G in adjusted position, as braces for the side-members of the auxiliary frame D at its middle where part of the strain upon the bar E, when the machine is in use, is transferred to the arched members 23, 23$^a$, and through them to the side-members of the auxiliary frame D.

I have already mentioned the shaft 15 which is journaled in the bearings 14 located near the rear end of the bars 12, 13, upon the main frame A. Upon this shaft there is mounted an arm H, which connects with the auxiliary frame D by a chain 26. Upon this shaft 15, and preferably at one end thereof so as to be within easy reach of an attendant who will be seated upon the seat J, fastened to a spring-support 27, located upon the pole C, is fastened a hand lever K, there being pivoted to said hand lever a downwardly pending member 28, having at its lower end a hook 29. This hand lever, when in its elevated position, permits the auxiliary frame D to lie close to the ground, but when depressed, as shown in dotted lines in Fig. 1, the auxiliary frame D with its attached parts will be sustained in an elevated position by said hook 29 automatically catching underneath the rear member of the main frame A, as indicated in Fig. 1.

It will now be observed that by my present construction I attain the result that in cultivating the soil especially for raising sugar beets, I combine a roller which will break up the clods after plowing, and at the same time harrow or rake the ground suitably for receiving the seed which is to be dropped by a separate machine suitable for this purpose, and that a single-row of teeth in the harrow are employed which are adapted to be set at the most favorable angle and which may be raised and lowered and which will be automatically locked in elevated position by a pivoted catch operating entirely by gravity.

Having thus fully described this invention I claim as new and desire to secure to me by Letters Patent of the United States—

In a combined roller and harrow, the combination, with the main frame of a roller adapted to support said main frame, an auxiliary frame pivoted to said main frame, a bar in said auxiliary frame, said bar being pivoted in the end members of said auxiliary frame, harrow teeth projecting from the lower face of said bar, an arm attached to said bar, two curved members upon the side members of said auxiliary frame, and connecting the same there being apertures in said curved members, and a bolt adapted to engage said arm and lock the same to said curved members, said curved members being in closely-spaced relation, said arm being located in the space between said curved members, said curved members being located approximately in the middle of said auxiliary frame and affording braces for the side-members of said auxiliary frame.

In testimony that I claim the foregoing as my invention I have hereunto set my hand in the presence of two subscribing witnesses.

HENRY CORDES.

Witnesses:
J. M. KELLEY,
JOHN T. CARROLL.